(12) United States Patent
Koike et al.

(10) Patent No.: US 6,310,672 B1
(45) Date of Patent: *Oct. 30, 2001

(54) COLOR DISPLAY DEVICE HAVING FILTERLESS AREAS

(75) Inventors: Yoshio Koike; Manabu Sawasaki, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,221

(22) Filed: Apr. 13, 1999

(30) Foreign Application Priority Data

Dec. 28, 1998  (JP) .................................................. 10-372789

(51) Int. Cl.[7] .......................... G02F 1/1335; G02F 1/1343
(52) U.S. Cl. ............................................ 349/106; 349/143
(58) Field of Search .................................... 349/106, 110, 349/111, 139

(56) References Cited

U.S. PATENT DOCUMENTS

| 4,733,948 | * | 3/1988 | Kitahara | 349/106 |
| 4,802,743 | * | 2/1989 | Takao et al. | 349/106 |
| 5,101,289 | * | 3/1992 | Takao et al. | 349/106 |
| 5,420,708 | * | 5/1995 | Yokoyama et al. | 349/110 |
| 5,633,739 | * | 5/1997 | Matsuyama et al. | 349/106 |
| 5,712,064 | * | 1/1998 | Miyazaki et al. | 349/106 |
| 5,757,452 | * | 5/1998 | Masaki et al. | 349/110 |
| 5,818,550 | * | 10/1998 | Kadota et al. | 349/106 |
| 5,822,026 | * | 10/1998 | Matsuo | 349/106 |
| 5,844,646 | * | 12/1998 | Yanai | 349/110 |
| 5,861,928 | * | 1/1999 | Sekiguchi | 349/106 |
| 5,866,919 | * | 2/1999 | Kwon et al. | 349/110 |
| 5,910,829 | * | 6/1999 | Shimada et al. | 349/106 |

FOREIGN PATENT DOCUMENTS 1062821   3/1998  (JP) .

* cited by examiner

Primary Examiner—James A. Dudek
Assistant Examiner—Dung Nguyen
(74) Attorney, Agent, or Firm—Greer, Burns & Crain, Ltd.

(57) ABSTRACT

A color display device comprises a substrate, pixel structure demarcating a multiplicity of light-transmissive unit display regions formed on said substrate and color filters configured to cover only a part of area of respective unit display regions and not to cover the remaining are of the unit display region. A color display device which can be easily designed and is capable of producing desired color reproducibility and light transmissivity is provided.

20 Claims, 11 Drawing Sheets

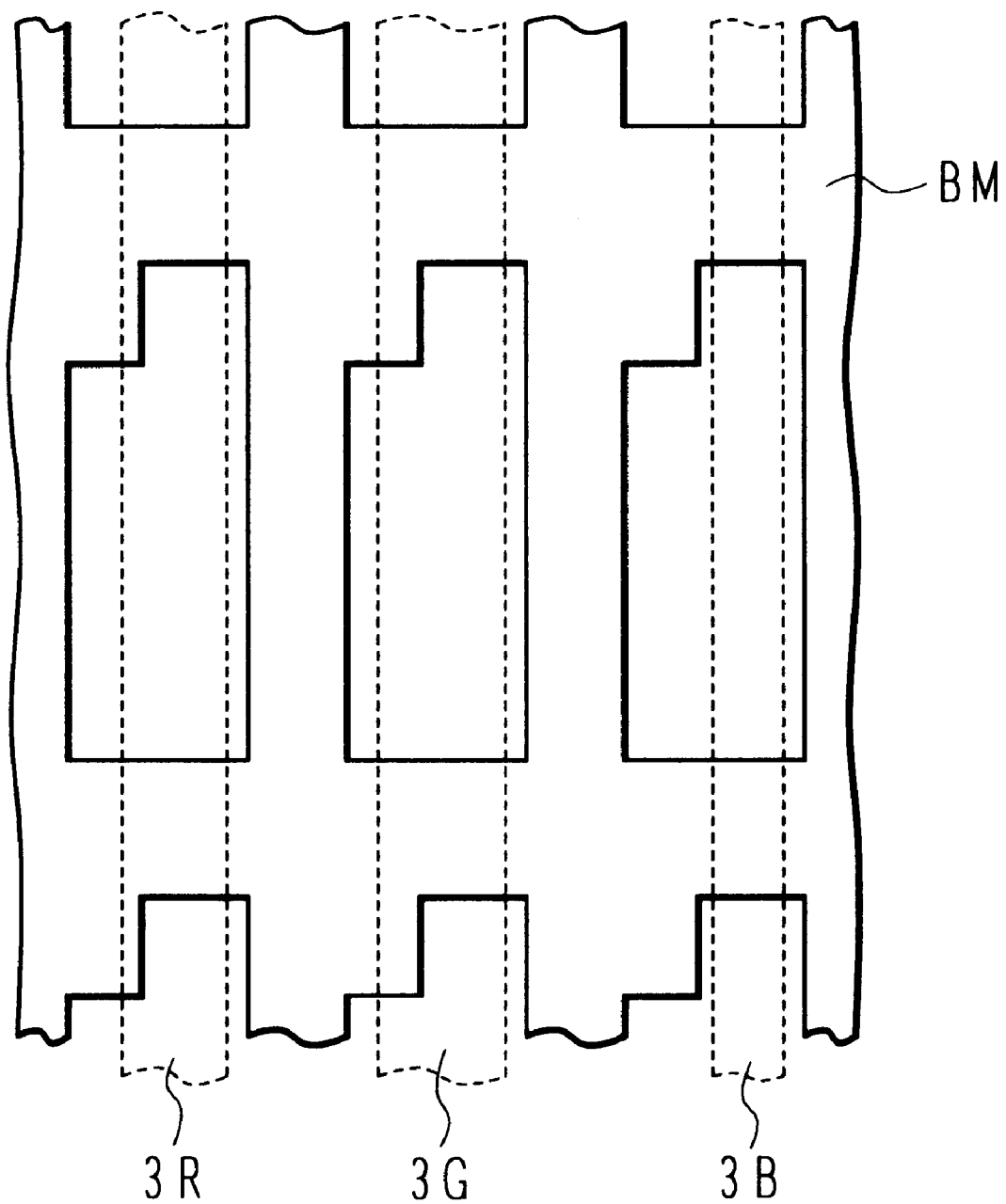

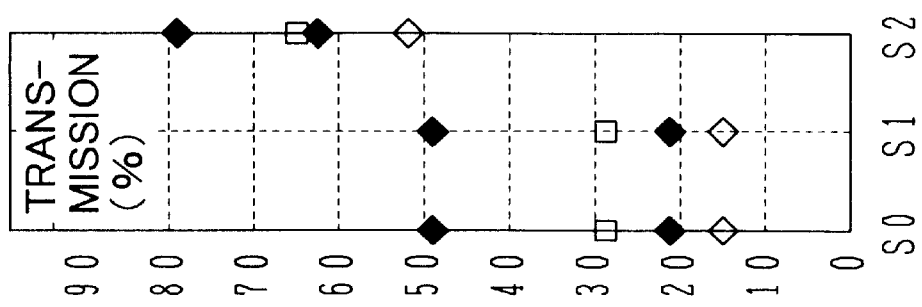
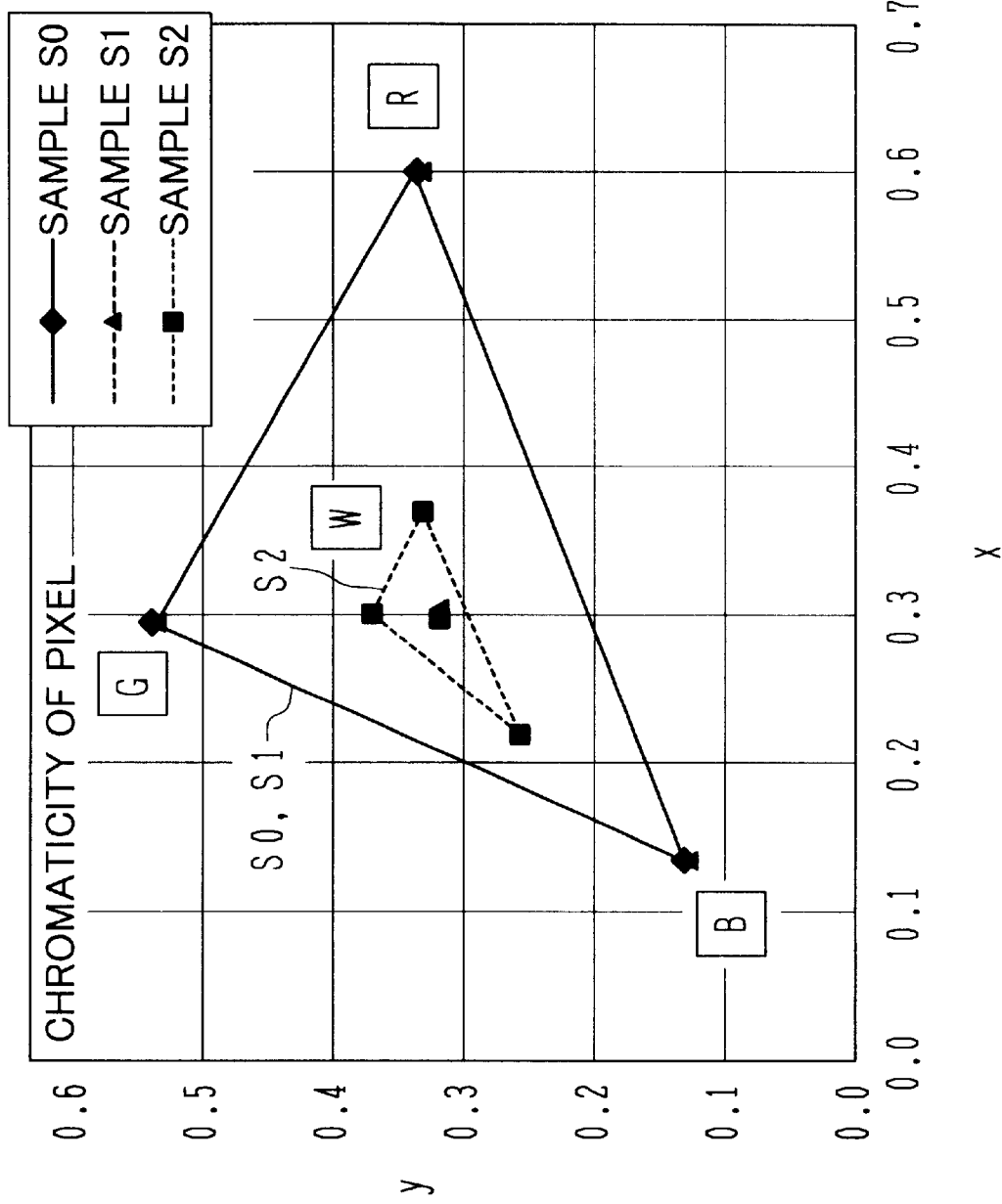

FIG.4E

| SAMPLE | OPTICAL PROPERTIES OF COLOR FILTER |||||| OPTICAL PROPERTIES OF PIXEL ||||
|---|---|---|---|---|---|---|---|---|---|---|
| | THICKNESS | COLOR | Y (%) | x | y | AREAL RATIO | COLOR | Y (%) | x | y |
| S0 | 1.3 μm | R | 21 | 0.60 | 0.34 | 100% | R | 21 | 0.60 | 0.34 |
| | | G | 49 | 0.30 | 0.54 | | G | 49 | 0.30 | 0.54 |
| | | B | 15 | 0.14 | 0.13 | | B | 15 | 0.14 | 0.13 |
| | | W | 29 | 0.30 | 0.32 | | W | 29 | 0.30 | 0.32 |
| S1 | 1.63 μm | R | 18 | 0.64 | 0.33 | 80% | R | 21 | 0.60 | 0.34 |
| | | G | 43 | 0.30 | 0.57 | | G | 49 | 0.30 | 0.54 |
| | | B | 12 | 0.14 | 0.12 | | B | 15 | 0.14 | 0.13 |
| | | W | 25 | 0.30 | 0.31 | | W | 29 | 0.30 | 0.32 |
| S2 | 1.3 μm | R | 21 | 0.60 | 0.34 | 20% | R | 63 | 0.37 | 0.33 |
| | | G | 49 | 0.30 | 0.54 | | G | 79 | 0.30 | 0.37 |
| | | B | 15 | 0.14 | 0.13 | | B | 52 | 0.22 | 0.26 |
| | | W | 29 | 0.30 | 0.32 | | W | 64 | 0.30 | 0.32 |

COLOR DISPLAY DEVICE HAVING FILTERLESS AREAS

This application is based on Japanese patent application No. Hei 10-372789, filed on Dec. 28, 1998, the entire contents of which are incorporated herein by reference.

BACKGROUND OF THE INVENTION a) Field of the Invention

This invention relates to a color display device and more particularly to a color display device comprising a multiplicity of display areas.

b) Description of the Related Art

A flat panel such as a liquid crystal display (LCD), a plasma display panel (PDP) and the like is widely used as a display device.

Recently, color LCDs and color PDPs that have a variety of abilities in color display are commonly used Usually color filters are used to perform color display while utilizing the advantages of a flat panel, such as thinness, lightweight and the like.

A color filter is a filter that transmits only such visible light that has a selected wavelength range. Corresponding to the principles of light mixing and separating, there are three-primary-color filters, which are red (R), green (G) and blue (B) filters, and complementary-color filters, which are cyan (C), magenta (M) and yellow (Y) filters.

A color display device for performing optional color display comprises a multiplicity of unit display regions on which predetermined color filters are disposed. The color display device performs desired color display by controlling transmission or reflection of each unit display. In order to make a display image vivid by preventing color mixing, it is widely performed that an area of each unit display region is demarcated by covering the periphery thereof with a black matrix (BM) such as metal, opaque resin and the like. In that case, an opening of the BM will be the unit display region that will be also a light transmissive region.

A liquid crystal display (LCD) will be described hereinbelow, as an example of the color display. An LCD controls an optical characteristic of a liquid crystal layer sandwiched between a pair of substrates with respective electrodes by impressing voltage across the liquid crystal layer. Transmissivity of light as a whole is controlled, if necessary, by combining a polarizer or polarizers. A pair of transparent substrates such as glass or the like is used for a transmissive-type display device. For a reflective-type display device, at least one of two substrates through which light transmits is a transparent substrate.

There are known systems for driving a display region; one is the simple matrix system in which a plurality of electrodes (common electrodes and segment electrodes) crossing each other are formed on a pair of facing substrates, and another is the active matrix system in which a whole surface electrode (a common electrode) is formed on one substrate, and a picture-element (pixel) electrode and a switching transistor are formed in each unit display region on the other substrate in order to store desired voltage in each pixel.

To realize the active matrix display with glass substrates, a thin film transistor (TFT) made of amorphous silicon (a-Si) or polycrystallized silicon (poly-Si) is used as material for forming a switching transistor. One current electrode (hereinafter, referred to as a source electrode) of TFT is connected to a pixel electrode, and the other (hereinafter, referred to as a drain electrode) is connected to a data line. A control electrode (a gate electrode) is connected to a scanning line, and the data and the scanning lines are configured to cross each other on the substrate.

It is preferable for a color display to have high color reproducibility and a high transmissivity of light. The color reproducibility depends on the coordinates of chromaticity. In case of RGB-type, a wider area of a triangle formed on the coordinates of chromaticity with each of color filters (red, green and blue) makes higher color reproducibility. The transmissivity of light depends on the output-light intensity when white light is irradiated on each color filter and on an aperture ratio of the BM.

A high transmissivity of light is desired to get a bright color display, especially in a color LCD for a notebook computer and in a reflective-type LCD. In such a case, it is desired to increase the aperture ratio of the BM by narrowing a width of the BM between the light transmissive regions, and to increase the transmissivity of color filters by thinning the color filters or changing their material.

The color filters cover a whole surface of each light transmissive region, which is referred to as the unit display region, and are configured to overlap the BM surrounding the light transmissive regions. Narrowing the width of the BM might risk adjacent color filters overlap each other, which may cause aberrant thickness and lower a yield of the production process. It requires new experiments to determine new conditions to change a film thickness of color filters or material for changing a design of an LCD, and causes lowering in throughput and productivity in a mass production.

SUMMARY OF THE INVENTION

An object of this invention is to provide a color display device that is easily designed and is capable of producing desired color reproducibility and light transmissivity.

According to one aspect of this invention, there is provided a color display device comprising a substrate, a pixel structure demarcating a multiplicity of light-transmissive unit display regions formed on said substrate and color filters configured to cover only a part of area of respective unit display regions and not to cover the remaining of the unit display region.

Because the color filter is configured only on a part of the unit display region that is the light transmissive region, the unit display region is divided into regions one of which has the color filter and the other not. Bright color display is obtained by expanding the region having no color filter within the unit display region. By adjusting an areal ratio of the regions with and without a color filter, it is possible to realize a variety of color reproducibility with the same material and the same film thickness for the color filters.

As explained above, it is possible to get desired color reproducibility and brightness by adjusting areas occupied by the color filters in the unit display regions of the color display device. Moreover, it becomes easier to keep up with a change in the design, and to increase a throughput of a mass production. A bright color display device can be provided.

BRIEF DESCRIPTION OF THE DRAWINGS

FIG. 3 is a plan view of a modification of the embodiment illustrated in FIGS. 1A to 1C.

FIGS. 4A to 4E are graphs and a table explaining functions of the device according to the embodiment illustrated in FIGS. 1A to 1C and in FIG. 3.

DETAILED DESCRIPTION OF THE PREFERRED EMBODIMENTS

The preferred embodiments of this invention will be explained in the following with reference to the drawings. Although an LCD is used to describe the embodiments as an example, this invention is in no way limited to an LCD. For example, the invention can be applied to a PDP and the like.

Figure 1A:
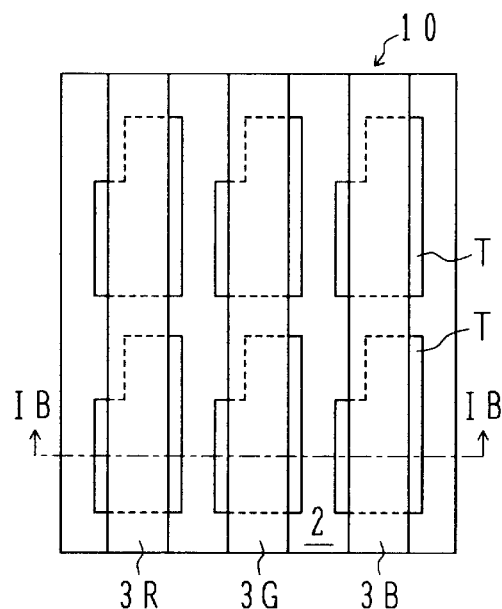
FIGS. 1A to 1E are plan views and cross-sectional views showing a comparison of a liquid crystal display device according to an embodiment of this invention with a conventional liquid crystal display device.
Figure 1B:
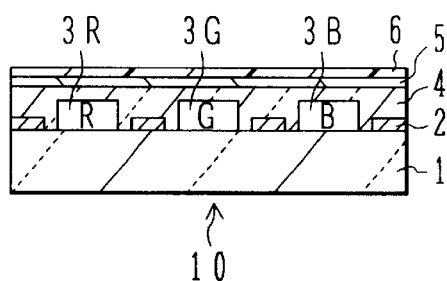
Figure 1C:
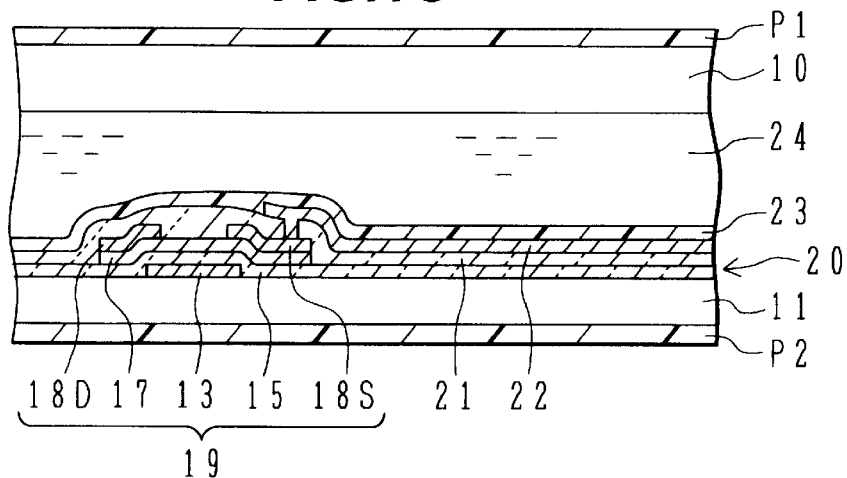
Figure 1D:
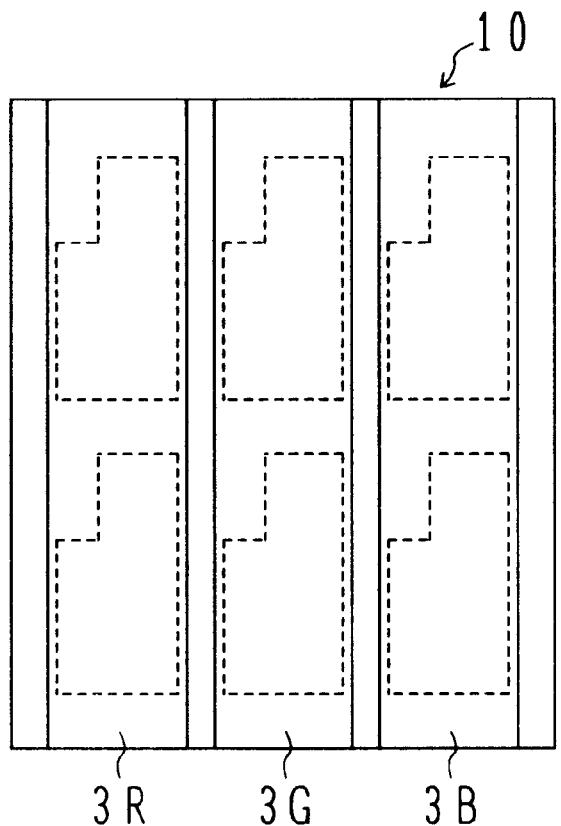
Figure 1E:
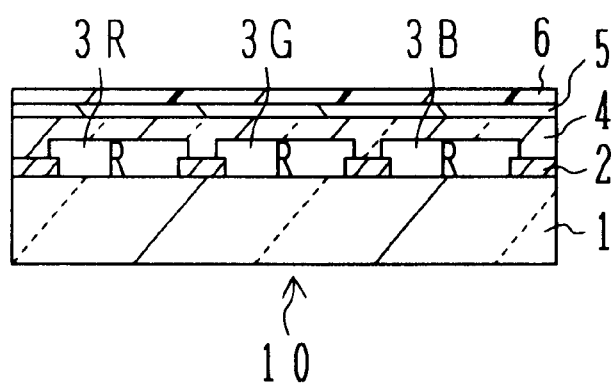

FIGS. 1A to 1C show the structure of the transmissive-type LCD according to an embodiment of this invention, and FIGS. 1D and 1E show that of the conventional liquid crystal display device. FIG. 1A is a plan view of a color filter substrate. FIG. 1B is a cross-sectional view of the color filter substrate of FIG. 1A. FIG. 1C is a cross-sectional structural view of the LCD. FIG. 1D is a plan view of a color filter substrate according to the conventional technique. FIG. 1E is a cross-sectional view of the color filter substrate according to the conventional technique of FIG. 1D.

First, a structure of the conventional color filter substrate is described with reference to FIGS. 1D and 1E. A BM 2 is formed on a glass substrate 1, and it demarcates light transmissive regions. On the light transmissive regions, color filters 3 are formed to overlap edges of the BM 2. Color filters 3R, 3G and 3B of three colors are formed in different process. A planarizing layer 4 is formed to cover the color filters 3, and forms the leveled or planarized surface. A transparent electrode 5 and an orientation layer 6 are formed on the leveled surface of the planarizing layer 4.

Narrowing the width of the BM 2 might risk the color filters 3 overlapping with adjacent color filters 3, which may cause aberrant thickness and lower a yield of the production process.

An LCD according to the embodiment of this invention is described with reference to FIGS. 1A, 1B and 1C.

As shown in FIGS. 1A and 1B, a color filter substrate 10 comprises a glass substrate 1 on which a BM 2 is formed thereon. The BM 2 can be formed, for example, by forming a single chromium layer, a laminate of chromium oxide film and a chromium film or a laminate of a chromium oxide film, a chromium nitride film and a chromium film by sputtering. A chromium oxynitride film can substitute the chromium nitride film.

Reflectance of the BM viewing from the side of the substrate 1 can be lowered by the above-mentioned laminate structure. A plan shape of the BM is same as in the conventional color substrate illustrated in FIG. 1D. The BM comprises a multiplicity of openings configured in a matrix shape, and each opening demarcates a unit display region that is a light transmissive region.

Color filters 3R, 3G and 3B in three colors are formed on the substrate on which the BM is formed by the way described above. The three color filters are formed individually. For example, a colored resin of a desired color is applied to coat the whole surface of the substrate by the spin-coater, the roll-coater, the slit-coater or the like. As the colored resin, for example CR-7001, CG-7001 and CB-7001 of Fuji Hunt, JAPAN, can be used.

After applying the colored resin, a colored resin film is exposed in the shape shown in FIGS. 1A and 1B. An exposed region is configured to retain the left and the right portions of each light transmissive region. The exposure intensity is, for example, 300 mJ/cm$^2$. After the exposure, the exposed colored resin is developed with an alkaline developing solution (for example CD of Fuji Hunt). After development, the colored resin film is post-baked in an oven at 230° C. for about an hour to harden the colored resin and thereby forms the color filter. In the above process, a color filter for one color is formed. These processes are repeated to make three of them.

By the repeated process described above, color filter stripes 3R, 3G and 3B of three colors are lined up in a transverse direction as shown in FIGS. 1A and 1B. Each color filter stripe extends in a longitudinal direction in the drawings, overlaps the BM and has a width narrower than that of the light transmissive regions. Therefore, within the light transmissive regions, regions T having no color filter are formed.

After forming the color filters, a transparent planarizing resin, for example HP-1009 of Hitachi Kasei, JAPAN, is applied to coat the substrate by the spin-coater to have a thickness of about 1.5 μm and post-baked at a temperature of 230° C. for about an hour in an oven. The asperity of the substrate surface made by the formation of the color filters 3 and the BM 2 is leveled by the planarizing resin layer 4, and thereby a leveled surface is provided.

On the leveled surface, an indium tin oxide (ITO) film is formed as a transparent electrode by sputtering. In this manner, a transparent common electrode 5 is formed on a whole surface of the substrate. A polyimide layer or the like is formed on the transparent common electrode 5 as an orientation film 6. After forming the orientation film, an orientation structure is formed by performing orientation treatment such as rubbing treatment or the like to the orientation film 6. In this manner, the color filter substrate 10 is formed, which comprises the BM which defines the openings as the unit display regions demarcating the light transmissive region, and the color filters formed on part of the aperture regions in the openings of the BM.

When characteristic of a light source is colored in a way deviating from the design, an optical characteristic of a liquid crystal display device as a whole is deviated from the design. In such a case, the optical characteristic of the liquid crystal display device as a whole can be compensated for by coloring the transparent planarizing resin layer 4.

As shown in FIG. 1C, the color filter substrate 10 is facing toward a TFT substrate 20 with a predetermined interval, and liquid crystal 24 is injected into a space between both substrates. A first polarizer P1 is formed on an outside surface of the color filter substrate 10, and a second polarizer P2 is formed on an outside surface of the TFT substrate 20.

The TFT substrate 20 is formed by the following steps. An SiO$_2$ layer is formed, depending on the necessity, on a surface of a glass substrate 11 by plasma enhanced CVD or the like, and thereon a gate electrode 13 is formed by depositing a Cr layer, a Ti/Al layer, a Mo layer or the like, and patterning the deposited layer with photolithography. A gate insulating film 15 is formed with an insulating film such as SiN$_x$, SiO$_2$ or the like to cover the gate electrode 13. On the gate insulating film 15, a semiconductor layer such as a-Si, poly-Si or the like is formed by chemical vapor deposition (CVD) or the like, and is patterned with photolithography, to form an active layer 17.

On the active layer 17, an n$^+$-Si layer and an Al layer or a Ti/Al/Ti layer is formed as a source and drain electrode layer, and patterned to form a source electrode 18S and a drain electrode 18D. A thin film transistor 19 is formed with the gate electrode 13, the gate insulating film 15, the active layer 17, the source electrode 18S and the drain electrode 18D.

After forming the source electrode 18S and the drain electrode 18D, an SiO$_2$ layer, a phosphosilicate glass (PSG) layer, a borophosphosilicate glass (BPSG) layer, an SiN layer or the like is deposited on a whole surface of the substrate as an inter-layer insulating film 21. A photo-resist layer is formed on the inter-layer insulating film 21, and openings are formed in a region where contact holes are formed. Then, openings are formed in a desired region of the inter-layer insulating film 21 by etching with a photo-resist pattern.

A transparent electrode 22 such as an ITO layer is formed on the interlayer insulating film 21 having the openings. A multiplicity of pixel electrodes disposed in a two-dimentional matrix are formed by patterning the ITO layer with photolithography and etching. A polyimide layer or the like is formed as an orientation film 23 to cover the pixel electrodes and the inter-layer insulating film. An orientation treatment such as rubbing or the like is applied to the orientation film 23 to get a desired orientation for liquid crystal molecules. On the other surface of the substrate 11, another polarizer P2 is formed.

When the color substrate 10 is changed to the substrate shown in FIGS. 1C and 1D, an LCD produced will be a conventional one. That is to say, only difference between the LCD according to the embodiment of this invention and the conventional LCD is that the color filter 3 covers whether a whole surface of the light transmissive region or just a part of it at a predetermined ratio.

According to this embodiment, the color filter 3 is configured on a part of the light transmissive region. Visible light having all range of wavelengths can penetrate through the remaining area of the light transmissive region. Therefore, the brightness of the LCD is remarkably increased by the region without the color filter. On the other hand, color reproducibility of color display is decreased because the color filter 3 is not configured on the whole surface, and all light having any wavelengths is transmitted through the area without the color filter.

However, in a specific use of a color display device, an increase in the light transmissivity has priority over the color reproducibility. In such a case, it is very effective for an increase in the light transmissivity to have the region T not having a color filter within the light transmissive region.

According to the embodiment, the transmissivity can be increased by adjusting the area of the region having no color filter within the light transmissive region. A change in desired light transmissivity requires only a change in the areal ratio of the region T to the other region, but does not require a change in the filme thickness and material of the color filter.

Figure 2A:
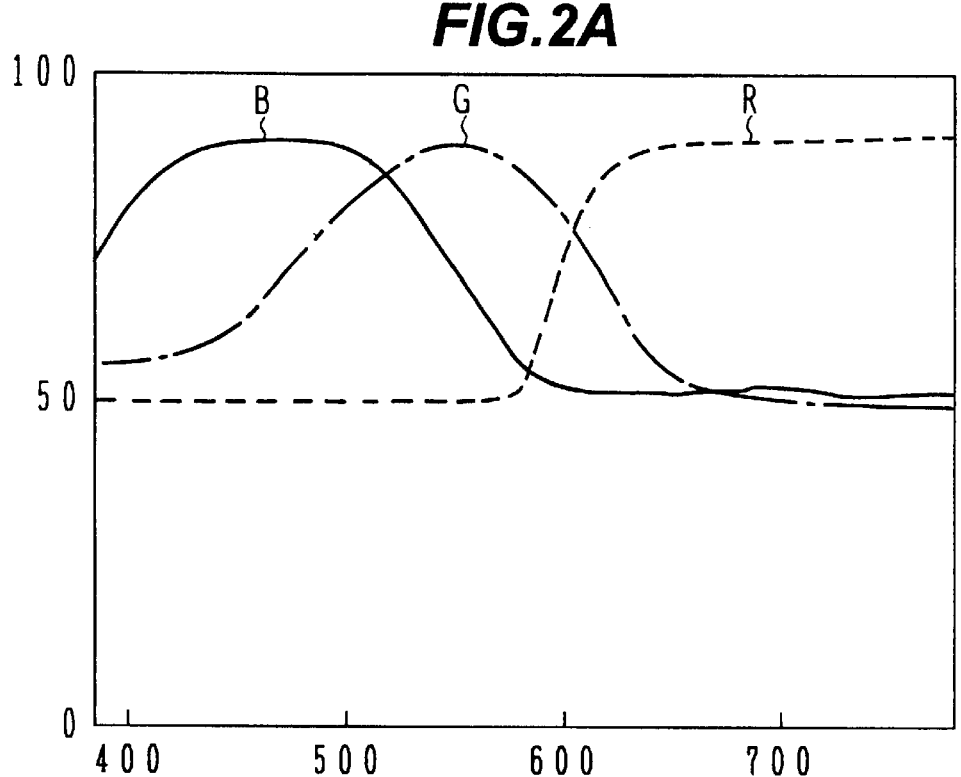
FIGS. 2A and 2B are graphs showing the comparison of a performance of the liquid crystal display device according to the embodiment illustrated in FIGS. 1A to 1C and a performance of the conventional liquid crystal display device.
Figure 2B:
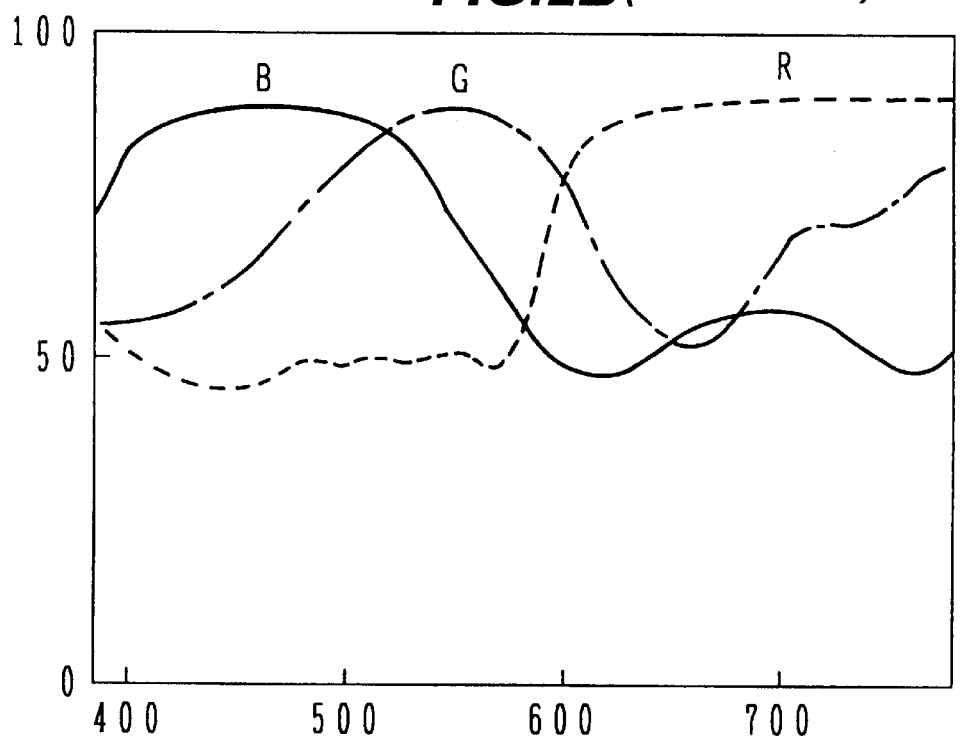

FIGS. 2A and 2B are graphs showing the characteristic of the high-transmissive LCD according to the embodiment of this invention in comparison to that of the conventional art. FIG. 2A shows the transmissivity of each light transmissive region according to the embodiment of this invention. FIG. 2B shows the transmissivity of each light transmissive region according to the conventional technique.

In FIG. 2A, the minimum light transmissivity can be obtained at all wavelengths because there is a region having no color filter. The case shown in FIG. 2A is a case in which the 50% of the transmissive regions have color filters, and the remaining 50% have no color filter. Because the 50% of the light transmissive region has no color filters, at least about 50% transmissivity can be obtained. Each color filter has the desired characteristic of color selectivity in that each color filter transmits only light of the desired wavelength and shields light of the other wavelength.

FIG. 2B show the transmissivity of each light transmissive region according to the conventional technique. A thickness of the color filter is decreased to get higher light transmissivity, and color concentration is decreased to get the desired light transmissivity. Each color filter's ability of shading undesired light is degraded thereby, and so almost 50% of undesired light at all wavelengths is transmitted through the color filters. That is to say, each color filter transmits light at a specified wavelength, but also transmits 50% of light at other wavelengths.

Comparing FIGS. 2A and 2B, their performances as a whole are almost the same. Therefore, the same performance as the conventional color display device can be obtained by the color display device according to this embodiment of the invention. According to the conventional technique, changing material and the film thickness of the color filter is necessary for new designing conditions which require new experiments, whereas the device according to the embodiment of this invention requires only a change in the occupying area of the color filters within the light transmissive region. Therefore, preparation of design changes can be simplified.

There is an additional feature of the device according to this embodiment. The color reproducibility and a light transmissive characteristic are easily calculated based on the areal ratio (%) of the color filter to the light transmissive region when well known material is used for forming the color filter having a predetermined film thickness.

FIG. 3 is a schematic plan view showing a structure of a modification of the embodiment illustrated in FIG. 1A to 1C. Materials that have well known characteristics are selected for color filters 3R, 3G and 3B formed on the light transmissive region. An occupying area of each color filter within the respective light transmissive region is controlled to get the desired color reproducibility and the light transmissivity. The occupying area of the color filters 3R, 3G and 3B differ from each other. It is possible to control the light transmissivity and the color reproducibility by adjusting the area having no color filter within each light transmissive region for each color filter.

Figure 4B:
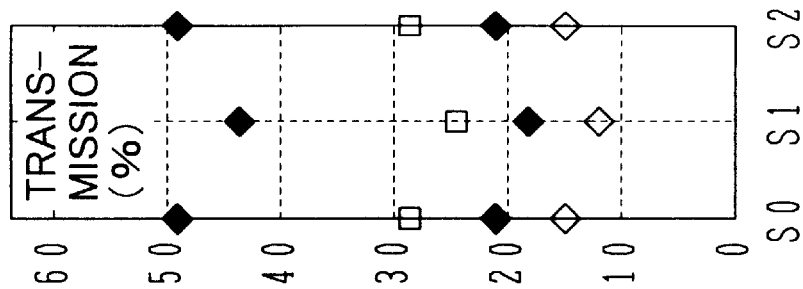
Figure 4A:
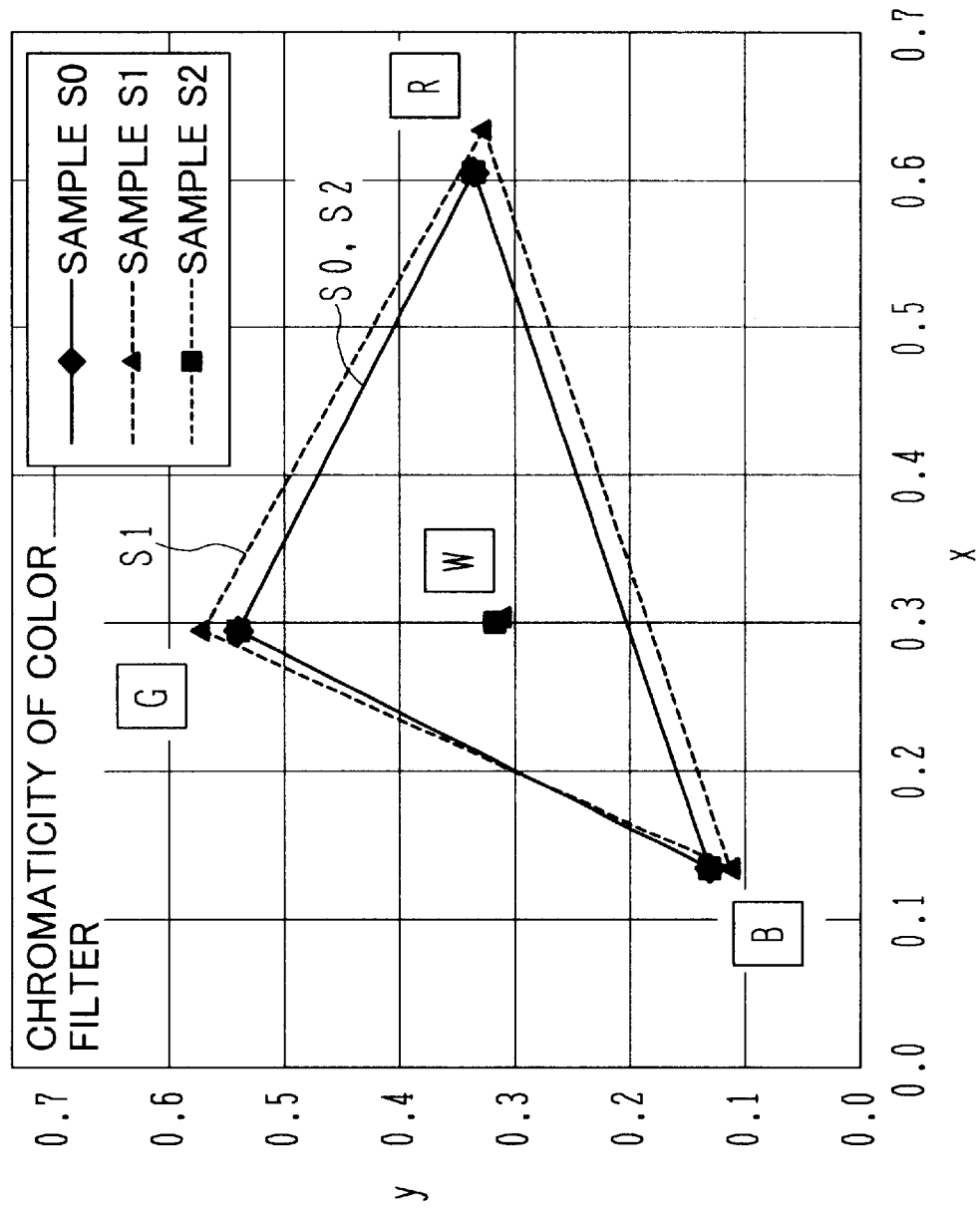

FIGS. 4A to 4E are graphs explaining functions of the embodiment shown in FIGS. 1A to 1C and 3. FIGS. 4A and 4C are chromaticity coordinates graphs which are plots of chromaticity coordinates of three primary colors and plots of chromaticity coordinates illustrating the possible color reproducibility of the color filter substrate as a whole. FIGS.

4B and 4D are graphs illustrating the visible light transmissivity. FIGS. 4A and 4B illustrate characteristics of the region having the color filters, and FIGS. 4C and 4D illustrate characteristics of whole pixel including three primary colors.

For evaluating the characteristics, three kinds of samples are examined. Sample S0 is a sample device according to the conventional technique having the color filters all over the surface of the light transmissive region, and the film thickness of the color filters is thinned to increase the light transmissivity. Sample S1 is a sample device according to the embodiment of this invention having the color filters only on a part of the light transmissive region. Sample S2 is a sample device having the color filters only on a part of the light transmissive region according to the embodiment of the invention and the film thickness of the color filters is further thinned, in the same way as the sample S0, to increase the light transmissivity. FIG. 4E is a table illustrating conditions and characteristics of each sample together.

"The expression colored resin part above openings" in the table refers to the region having the color filters. Numerical values under the visible transmissivity Y, the chromaticity coordinates x and y are measured values. The color filters of sample S0 and S2 are the same, and therefore yield same numerical values. "The expression as a CF substrate" shows a characteristic of the light transmissive regions including the regions having the color filters and the regions without color filters. Areal ratios of the regions with the color filters to the light transmissive area are shown in percentage (%).

The sample S0 according to the conventional technique has the color filters all over the light transmissive region, and so the characteristic of the colored resin part above the openings and the characteristic as the CF substrate are the same. On the other hand, because the samples S1 and S2 both comprise the region not having the color filters, they have the increased characteristic in the transmissivity Y as the CF substrates, compared to the characteristic of the colored resin part, and also the characteristic in the chromaticity coordinates x and y changes. Here, the optical characteristics of the samples S1 and S2 as the CF substrates are calculated by simulation.

FIG. 4A is a graph showing the chromaticity coordinates on the color filters of each sample. The samples S0 and S2 have the same chromaticity coordinates because they use the same material as the color filters. The sample S1 has the outer plot on the chromaticity coordinates than that of the sample S0 by using the color filters having the better color selectivity. Therefore, the sample S1 has the best color reproducibility on the color filters.

As shown in FIG. 4B, in the visible light transmissivity, the sample S1 that has the better color reproducibility has the lower light transmissivity than the sample S0 and S2 that have the thinner color filter thickness.

FIG. 4C is a graph showing the chromaticity coordinates of each light transmissive region as a whole. In the sample S1 and S2, because there are the regions having the color filters on the light transmissive regions and the regions having no color filter, the characteristics of the light transmissive regions as a whole are different from those of the light transmissive regions having the color filters.

By adjusting the areal ratio of the region having no color filter within the light transmissive region, the sample S1 is selected to have the same chromaticity coordinates as the sample S0 having the color filters all over the surface of the light transmissive region according to the conventional technique. Therefore, the chromaticity coordinates of the samples S0 and S1 are the same.

In the sample S2, the material used as the color filter is similar to that in the sample S0, and the area having the color filters is limited to 20% of the light transmissive region. Thereby the color reproducibility is lowered compared to the case where the color filters are formed all over the light transmissive region.

FIG. 4D is a graph showing the visual light transmissivity. By adjusting the size of the area having no color filters, the sample S1 is adjusted to have the equivalent visual transmissivity to the sample S0 which has the color filters all over the light transmissive regions. The sample S2 has the same color filters as the sample S0 and has a wide area having no color filters over the light transmissive region. The visual light transmissivity is improved by adjusting the size of the area having no color filters.

Thin color filters that are hard to be produced may be needed to brighten an LCD by thinning film thickness of the color filters. There is no technical difficulty in this embodiment to brighten an LCD by making the occupying area of the color filter small.

FIGS. 5A to 5G are plan views showing examples of configurations of the color filters over the light transmissive region. Relationship between opening area OA of the black matrix and regions CF where the color filters are configured is shown schematically in the figures.

Figure 5A:
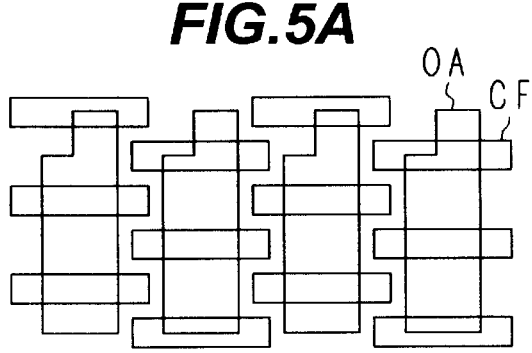
FIGS. 5A to 5G are plan views of examples of configurations of light transmissive regions and color filters in the device according to the embodiment illustrated in FIGS. 1A to 1C.

As shown in FIG. 5A, pluralities of the color filter regions CF are configured to form transverse stripes within each light transmissive region. Each color filter region CF is configured abreast in a longitudinal direction and has the larger size than a transverse size of the opening area (a light transmissive region) OA of the black matrix, and so extends onto the black matrix BM.

Figure 5B:
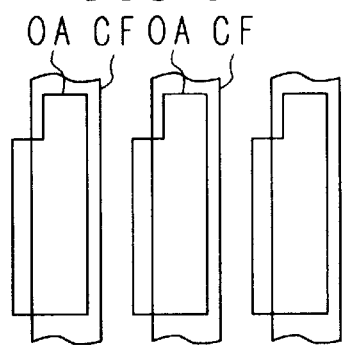

FIG. 5B shows a structure in which the color filter regions CF extend inward from the outside of the opening area OA of the black matrix in a predetermined direction. For example, in case that 90% of the light transmissive region is covered by the color filters, certain level of technique is needed to configure the whole area having the color filters inside the openings OA. Forming the color filter regions from the outside (right-hand side) of each light transmissive region to an intermediate position (predetermined point in the transverse direction) of the light transmissive region, as shown in this example of a structure, decrease a precision requirement of forming the color filters CF because the precise placement of the color filters CF is required only at one side (left-hand side) in a transverse position.

By making a study of the relationship between the edges of the color filters which are long in the longitudinal direction and are adjacent to each other in the transverse direction, it is seen that the first color filter CF extends to the outside of the light transmissive region and extends onto the BM, but the second color filter CF has the edge drawn inside the light transmissive region. Therefore, the risk that the adjacent color filter regions CF on the light transmissive region OA might overlap each other on the BM is decreases.

Figure 5C:
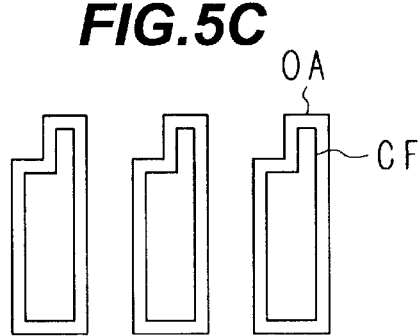
Figure 5D:
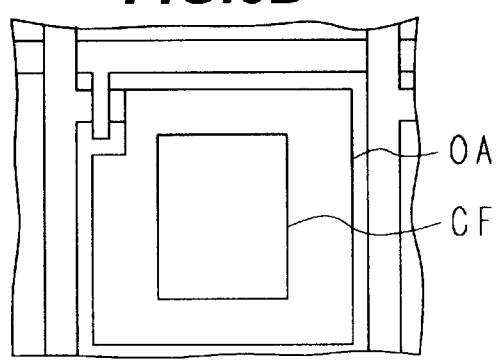

FIGS. 5C and 5D are examples of structures in which contiguous single-unit color filter regions CF are formed. In FIG. 5C, the color filter regions CF each being formed inside a light transmissive region OA are shaped almost similar to the shape of the light transmissive region OA.

FIG. 5D shows a case that the regions CF where the color filters are formed are shaped to be a rectangular region disposed at the center of the light transmissive region. As shown in FIGS. 5C and 5D, by separating the color filter CF from the edge of adjacent color filter on the light transmissive region at a distance larger than a positioning error, the light transmissivity will not be affected by the positioning error.

Figure 5E:
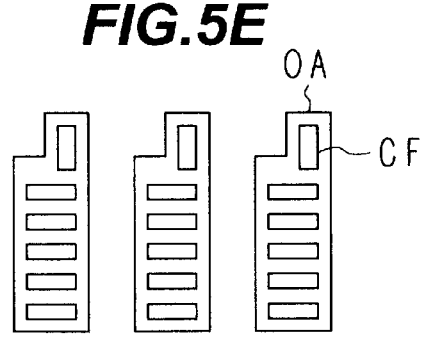
Figure 5F:
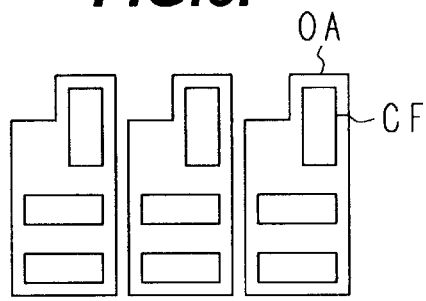
Figure 5G:
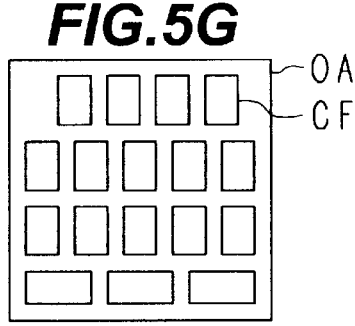

FIGS. 5E, 5F and 5G show cases where the plurality of the regions where the color filters are formed are configured inside each light transmissive region OA. As shown in FIG. 5E, six color filter regions are configured in each light transmissive region OA.

In FIG. 5F, the number of the color filter regions configured in each light transmissive region is decreased to three regions.

FIG. 5G shows an example in which regions where the color filters are configured are divided into sub areas in a matrix shape within each light transmissive region, and the color filters are configured at the sub areas.

In FIG. 5G, the regions where the color filters are configured are formed in the matrix shape of the plurality of rows and columns.

Visibility when an area of pixels is wider can be increased by increasing the number of the color filter regions configured in each light transmissive region and dispersing the color filter regions configured in each light transmissive region.

Figure 6A:
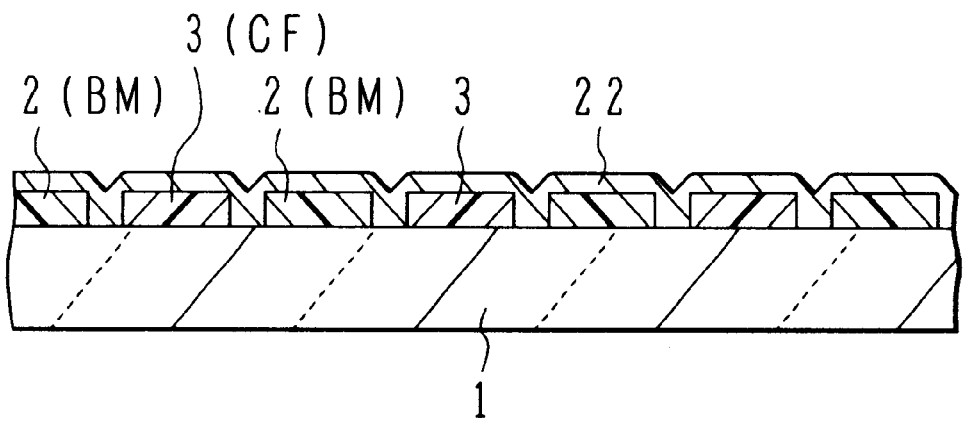
FIGS. 6A to 6C are cross-sectional views of a liquid crystal display device according to other embodiments of this invention showing structures of a color filter substrate.
Figure 6B:
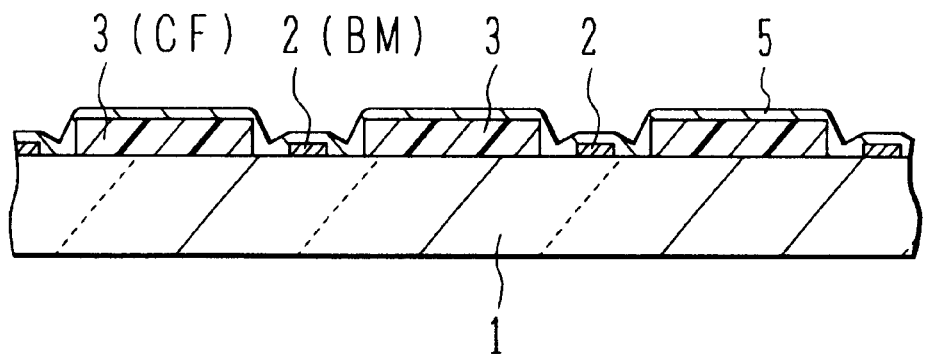
Figure 6C:
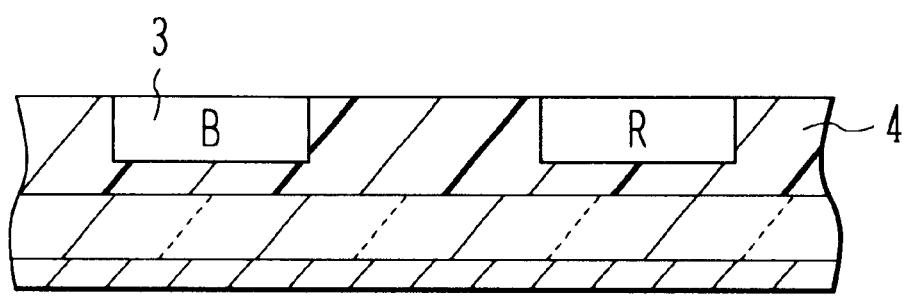

FIGS. 6A to 6C are schematic cross-sectional views of the other example of a structure of an LCD device according to the embodiments of this invention.

In FIG. 6A, a black matrix BM is formed with a resin. Therefore, it is possible to make the height (film thickness) of the black matrix similar to that of the color filter CF. For example, with an adoption of the configurations shown in FIGS. 5C to 5G, the black matrix is formed with opaque insulating organic resin layers and is configured adjacent to the color filters CF.

Because both of the black matrix BM and the color filters CF are formed with an organic material and have the equivalent film thickness, difference in the film thickness at the surface of the substrate is decreased. By covering the black matrix BM 2 and the color filters CF 3, an ITO layer 22 as a transparent electrode 5 is formed on the substrate. An orientation film 4 is formed on the surface of the ITO layer 22. By using a resin layer having the equivalent thickness to the CF layer 3 for the BM layer 2, unevenness of the surface of the substrate after the color filters are formed can be lowered.

FIG. 6B shows a structure of a device formed by the following process. A black matrix 2 is formed with metal such as Cr and the like on a glass substrate 1. Then, after color filters 3 are formed with a colored resin, transparent electrodes 5 are formed by being placed onto the black matrix 2 all over the surface of the substrate. The black matrix is formed with metal and has a high electroconductivity. The transparent electrodes are formed with ITO or the like, and thereby have the lower electroconductivity than metal. By electrically connecting the black matrix 2 and the transparent electrodes 5, effective resistance of the transparent electrodes 5 formed with ITO or the like can be lowered.

FIG. 6C shows a case of forming a planarizing layer 4 at first instead of forming it over the color filters. In the case, the planarizing layer 4 is formed at first, reentrant parts are formed thereon, and therein color filters 3 are formed as being embedded The surfaces of the color filters 3 and the planarizing layer 4 are formed to have a flush surface. Etching back and abrading can be employed to form the leveled surface. After the formation of the leveled surface, the transparent electrodes and the orientation layer are formed similar to the above-mentioned embodiments.

In the above-mentioned embodiments, are formed the color filters on the common electrode substrate forming a transparent electrode all over the substrate surface. The color filters can also be formed on a TFT substrate on which TFT are formed.

Figure 7A:
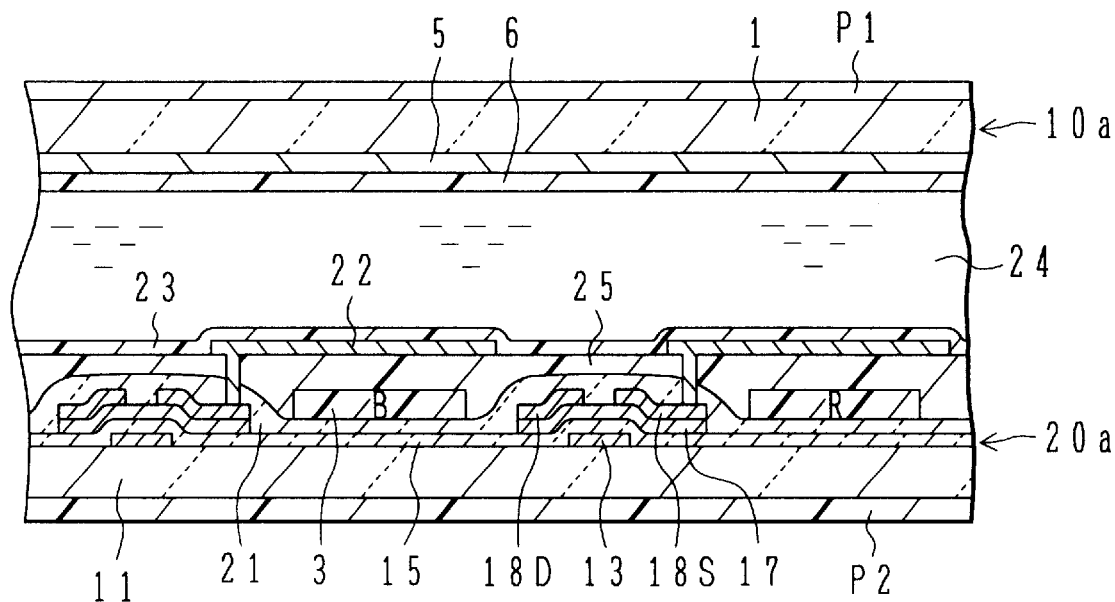
FIGS. 7A to 7C are a cross-sectional view and plan views of the device according to other embodiments of this invention showing structures of the device.
Figure 7B:
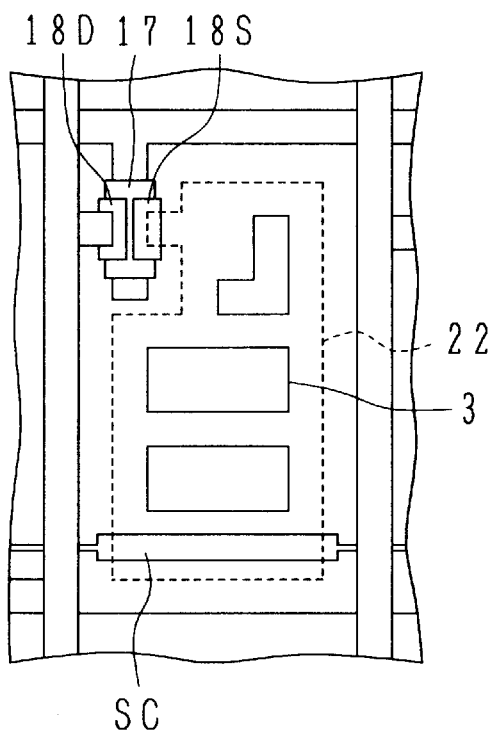

FIGS. 7A and 7B show a case where the color filters are formed on a TFT substrate. FIG. 7A is a cross-sectional view of an LCD, and FIG. 7B is a plan view of a structure of one pixel in the TFT substrate.

A TFT substrate 20a is formed by the following process. After an $SiO_2$ film is formed on the surface of a glass substrate 11, gate electrodes 13 are formed with metal such as Cr or the like. A gate insulating film 15 is formed to cover the gate electrodes 13. The gate insulating film 15 can be formed with, for example, an $SiO_2$ film, an SiN film or the like. Semiconductor layers of amorphous silicon (a-Si) or poly-crystalline silicon (poly-Si) are formed on the gate insulating film to form active layers 17 by patterning.

At both portions of each active layer 17, a drain electrode 18D and a source electrode 18S are formed by depositing an Si layer having a high impurity concentration and a Ti/Al/Ti layer or the like. After that, the surface of the substrate is covered by an inter-layer insulating film 21. The inter-layer insulating film 21 can be formed, for example, with $SiO_2$, SiN or the like.

On the inter-layer insulating film 21, color filters 3 are configured. Then, a planarizing film 25 is formed thereon. To form transparent electrodes 22, contact halls are bored through the planarizing film 25 and the inter-layer insulating layer 21. After patterning of the transparent electrodes 22, an orientation film 23 is formed on the surface and an orientation treatment is done thereon.

A common electrode substrate 10a opposing to the TFT substrate is formed by forming a common electrode 5 and an orientation film 6 on the surface of the glass substrate 1 and performing the orientation treatment to the orientation film 6. The common electrode substrate 10a has neither a black matrix nor a color filter and so it has a very simple structure. In such a case, the pixel electrodes (transparent electrodes), except the part overlapped with the source electrode, demarcate the light transmissive regions which are the unit display regions. Moreover, a black matrix as shown in FIG. 1B may be formed on the common electrode substrate 10a.

A polarizer P1 is formed on the outer surface of the common electrode substrate 10a, and another polarizer P2 is formed on the outer surface of the TFT substrate 20a.

FIG. 7B is a plan view of one light transmissive region showing a configuration of a TFT, color filters and a transparent electrode. The drawing also shows a storing capacity SC configured to overlap the lower side of the transparent electrode 22.

By the way, the color filter and the TFT can be overlapped, and the contact hall can be bored through the color filter 3.

Figure 7C:
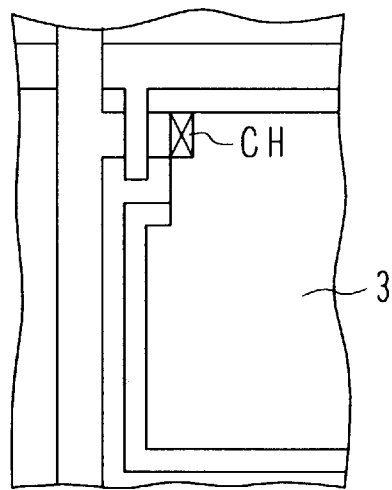

FIG. 7C is a plan view of the configuration in that way. The color filter 3 is overlapped with a part of the TFT, and the contact hall CH is bored through the color filter. In addition, in this configuration, the device is a top-gate type in which a gate electrode is configured on an active layer.

Although a transparent-type LCD is described in the above-mentioned embodiments, same configurations can be applied to a reflective-type LCD.

FIGS. 8A to 8D are schematic cross-sectional views showing a configuration of a reflective-type LCD according to the other embodiment of this invention.

Figure 8A:
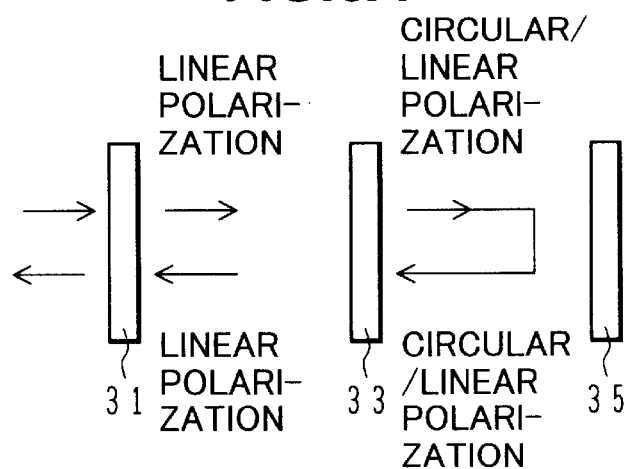
FIGS. 8A to 8D are schematic cross-sectional views of reflective-type liquid crystal display devices according to other embodiments of this invention.

FIG. 8A shows basic configuration of the reflective-type LCD In FIG. 8A, a linear polarizer 31, a liquid crystal display device 33 and a reflector 35 are stacked. Light is first irradiated to the linear polarizer 31 and then to a liquid crystal layer of the liquid crystal display device 33. The liquid crystal layer is designed to perform the function of a λ/4 plate. By transmitting through the λ/4 plate, linear polarized light is converted into circular polarized light. Moreover, if the liquid crystal display device is turned either on or off, the liquid crystal layer looses its function of the λ/4 plate, and thereby incident linear polarized light exits as linear polarized light.

The reflected light is reflected by the reflector 35 and irradiated into the linear polarizer 31 through the liquid crystal display device 33 again. In a case that circular polarized light irradiates onto the liquid crystal display device 33, the liquid crystal layer again performs the function of the λ/4 plate. Thereby circular polarized light becomes linear polarized light of different polarizing direction from incident linear polarized light at 90 degree and is cut by the linear polarizer 31. In a case where linear polarized light irradiates onto the liquid crystal layer, because the liquid crystal layer does not have the function of the λ/4 plate, the linear polarized light transmits through the linear polarizer 31.

Figure 8B:
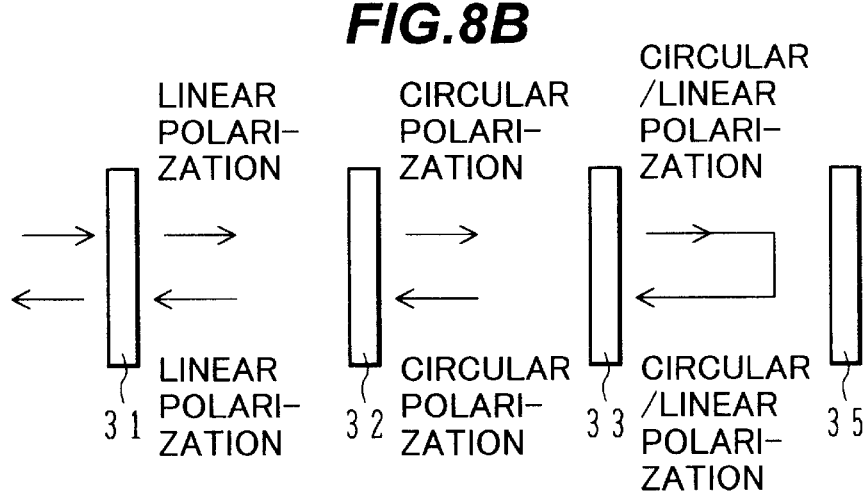

FIG. 8B shows a modified example of the reflective-type LCD. In this configuration, a λ/4 plate 32 is configured between a linear polarizer 31 and a liquid crystal display device 33 as an optical compensator. Therefore, linearly polarized light transmitted through the linear polarizer 31 is converted to circularly polarized light by passing through the λ/4 plate 32. The liquid crystal layer of the liquid crystal display device 33 functions as a λ/4 plate or a light transmissive plate, and thereby incident light exits after being converted into either linear polarized light or circular polarized light. Either of linear polarized or circular polarized light which is reflected by the reflector 35 changes into either of linear polarized or circular polarized light by transmitting through the liquid crystal display device 33. Then, it changes to linear polarized light by transmitting through the λ/4 plate 32, and transmits through the polarizer 31 or is blocked by the polarizer 31.

As a liquid crystal display device 33 shown in FIGS. 8A and 8B, an equivalent configuration to the above-mentioned embodiments can be used. More particularly, it is possible to use the configuration in which the polarizers P1 and P2 are taken away and the thickness of the liquid crystal layer is adjusted to function as the λ/4 plate. In addition, the liquid crystal display device can include the reflector 35 therein.

Figure 8C:
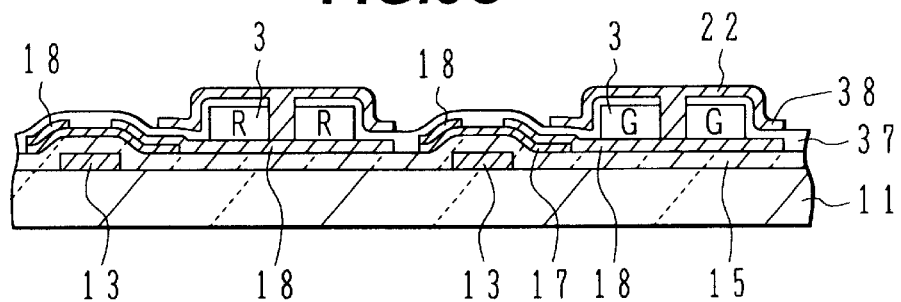

FIG. 8C shows an example of the configuration of the TFT substrate including the reflector 35 therein. Description will be made mainly on different portions of the TFT substrate from those of the liquid crystal display device illustrated in FIG. 1C.

One of the source/drain electrodes 18 formed on each active layer 17 is extended to the whole surface of the light transmissive region. These electrode layers 18 function as reflectors. After color filters 3 are formed on the reflectors 18, an interlayer insulating film 37 is formed. Contact holes are bored through the interlayer insulating film 37 and the color filters 3, and thereon a transparent electrode layer 22 is formed and connected to the respective reflection electrodes 18. The transparent electrode layer 22 is patterned to form pixel electrodes. By this configuration, light incident from the upper side of the drawing transmits through the transparent electrode 22, the interlayer insulating film 37 and the color filter 3, and then returns to the upper side by being reflected at the reflector electrode 18.

Figure 8D:
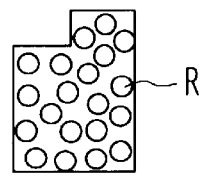

It is preferable that a reflection-type LCD comprises a light diffusing mechanism. FIG. 8D shows an example of color filter formed ruggedly on a surface. By forming a rugged distribution on the surface, light transmitting through the CF is refracted. By these refractions, the light diffusing mechanism is obtained.

This invention has been described in connection with the preferred embodiments. The invention is not limited only to the above embodiments. It will be apparent to those skilled in the art that various modifications, improvements, combinations and the like can be made.

What we claim are:

1. A color display device comprising:
    a substrate;
    a pixel structure demarcating a multiplicity of light-transmissive unit display regions formed on said substrate; and
    a color filter disposed on each of said unit display regions, covering only a part of each said unit display region and not covering a remaining area of each said unit display region, said remaining areas forming light transmissive areas without any color filter;
    wherein said remaining area and said part of each said unit display region define a first region and a second region, respectively, in which said first region is a region where white light is modulated and said second region is a region where light of a particular color, as defined by an associated one of said color filters, is modulated.

2. A color display device according to claim 1, wherein said pixel structure comprises a black matrix demarcating said light-transmissive unit display regions in a matrix shape.

3. A color display device according to claim 2, wherein said color filters are configured to be extended beyond said unit display regions to the black matrix in one direction of the matrix of said matrix-shaped unit display regions and are lined up in another direction of the matrix to form a multiplicity of color stripes.

4. A color display device according to claim 2, wherein each said color filter is configured only inside of each said unit display region and is displaced from edges of each said unit display region by a predetermined distance.

5. A color display device according to claim 4, wherein said color filters comprise color filter elements of three colors, and each said unit display region contains only one color filter element which occupies a certain area of each said unit display region in a size varying according to its color.

6. A color display device according to claim 5, further comprising:
    an opposing substrate opposite said substrate;
    a liquid crystal layer disposed between said substrate and said opposing substrate;
    a common electrode disposed on one of said substrate and said opposing substrate; and
    a multiplicity of picture electrodes being configured, respectively on said unit display regions, on the other of said substrate and said opposing substrate,
    wherein said color filters are disposed on said substrate or on said opposing substrate.

7. A color display device according to claim 6, wherein said color display device is a reflection-type liquid crystal display device.

8. A color display device according to claim 1, wherein each said color filter is configured only inside of each said unit display region and is displaced from edges of each said unit display region by a predetermined distance.

9. A color display device according to claim 8, wherein said color filters comprise color filter elements of three colors, and each said unit display region contains only one color filter element which occupies a certain area of each said unit display region in a size varying according to its color.

10. A color display device according to claim 1, wherein said color filters comprise color filter elements of three colors, and each said unit display region contains only one color filter element which occupies a certain area of each said unit display region in a size varying according to its color.

11. A color display device according to claim 10, wherein said color filter elements are configured within the respective said unit display regions and said color filter in each said unit display region is distributed dispersedly.

12. A color display device according to claim 1, further comprising a light transmissive planarizing layer formed with light transmissive material, surrounding said color filter, and forming a leveled surface.

13. A color display device according to claim 12, wherein said light transmissive-planarizing layer is colored.

14. A color display device according to claim 13, wherein said planarizing layer comprises a rugged surface, and said color filters are configured in concave part of said rugged surface to have the same surface with said planarizing layer.

15. A color display device according to claim 14, further comprising:
   an opposing substrate opposite said substrate;
   a liquid crystal layer disposed between said substrate and said opposing substrate;
   a common electrode disposed on one of said substrate and said opposing substrate; and
   a multiplicity of picture electrodes being configured, respectively on said unit display regions, on the other of said substrate and said opposing substrate,
   wherein said color filters are disposed on said substrate or on said opposing substrate.

16. A color display device according to claim 15, wherein said color display device is a reflection-type liquid crystal display device.

17. A color display device according to claim 13, further comprising:
   an opposing substrate opposing to said substrate;
   a liquid crystal layer disposed between said substrate and said opposing substrate;
   a common electrode disposed on one of said substrate and said opposing substrate; and
   a multiplicity of picture electrodes being configured, respectively on said unit display regions, on the other of said substrate and said opposing substrate,
   wherein said color filters are disposed on said substrate or on said opposing substrate.

18. A color display device according to claim 12, wherein said planarizing layer comprises a rugged surface, and said color filters are configured in concave part of said rugged surface to have the same surface with said planarizing layer.

19. A color display device according to claim 1, further comprising:
   an opposing substrate opposite said substrate;
   a liquid crystal layer disposed between said substrate and said opposing substrate;
   a common electrode disposed on one of said substrate and said opposing substrate; and
   a multiplicity of picture electrodes being configured, respectively on said unit display regions, on the other of said substrate and said opposing substrate,
   wherein said color filters are disposed on said substrate or on said opposing substrate.

20. A color display device according to claim 19, wherein said color display device is a reflection-type liquid crystal display device.

* * * * *

UNITED STATES PATENT AND TRADEMARK OFFICE
CERTIFICATE OF CORRECTION

PATENT NO.   : 6,310,672 B1  Page 1 of 1
DATED        : October 30, 2001
INVENTOR(S)  : Koike et al.

It is certified that error appears in the above-identified patent and that said Letters Patent is hereby corrected as shown below:

Title page,
Item [56], References Cited, FOREIGN PATENT DOCUMENTS, insert -- 086006 1/1996 (JP) --.

Column 13,
Line 10, before "said" insert -- each --.
Line 10, delete "filters comprise" and insert -- filter comprises --, therefor.

Signed and Sealed this

Tenth Day of September, 2002

Attest:

Attesting Officer

JAMES E. ROGAN
*Director of the United States Patent and Trademark Office*